P. F. NAFTEL AND H. H. GARNER.
TRACTOR TREAD OILER.
APPLICATION FILED SEPT. 25, 1917.

1,339,523.

Patented May 11, 1920.

UNITED STATES PATENT OFFICE.

PAUL F. NAFTEL AND HERMAN H. GARNER, OF POMONA, CALIFORNIA.

TRACTOR-TREAD OILER.

1,339,523.  Specification of Letters Patent.  Patented May 11, 1920.

Application filed September 25, 1917. Serial No. 193,088.

*To all whom it may concern:*

Be it known that we, PAUL F. NAFTEL and HERMAN H. GARNER, citizens of the United States, residing at Pomona, in the county of Los Angeles and State of California, have invented a new and useful Tractor-Tread Oiler, of which the following is a specification.

Our invention relates to an oiler for chain belts, and more particularly to an oiler for such chain belts as are used for treads on the tracklaying or crawler type of tractors. The objects of our invention are, first, to provide a continuous supply of lubricant to each link of the chain; second, to apply the lubricant from the inside of the link bearing so that in working out it may carry any grit or dirt away from the wearing surfaces; and third, to provide a quick and easy means for replenishing the lubricant to all of the links.

Our device consists essentially of a continuous flexible reservoir for lubricant, running the length of the chain, and connected by passages with the bearings in the links. This reservoir may be formed by hollow passages in the links and connected from one link to the next, or by tubes attached to the links, or by a combination of such tubes and passages.

Figure 1:
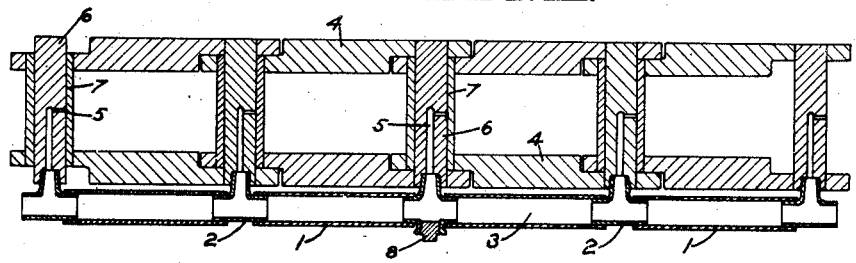
Figure 2:
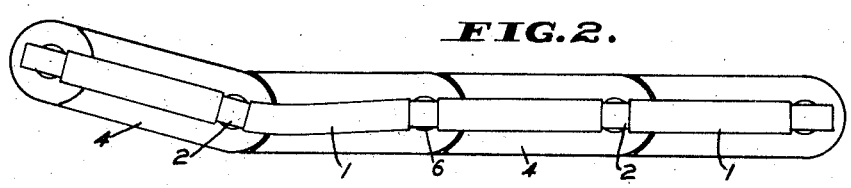
Figure 3:
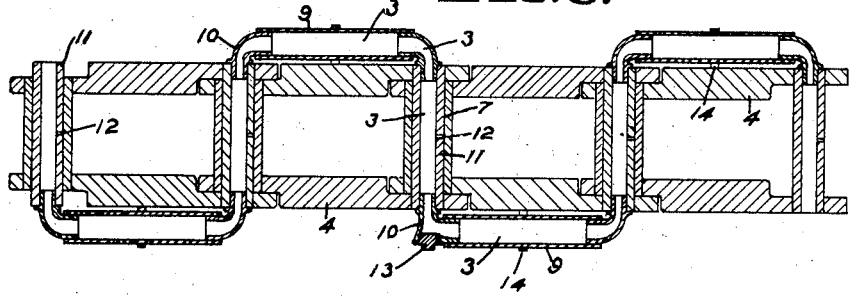

In the accompanying drawing Figure 1 is a sectional plan view of our oiling device as applied to a section of chain. Fig. 2 is a side view showing the bending of the flexible tube when the chain bends. Fig. 3 is a sectional plan view showing a modified construction using hinged rigid tubes and passages through the links of the chain.

Referring to Fig. 1 and Fig. 2, the flexible tubes 1 together with the connections 2, form a continuous space 3 for oil, running the length of the chain 4. This oil space 3 is connected by passages 5 through the bearing pins 6 to the inside of the bearings 7. The space 3 may be filled with oil by removing the plug 8. The tubes 1 are preferably made of flexible metallic hose which will readily conform to all movements of the chain as it runs over sprocket wheels. It will be understood that in use the ends of the chain are ordinarily joined together to form an endless belt which runs over sprockets, and the tubes 1 and connections 2 are likewise joined together to form an endless space 3 through which the oil will naturally circulate by gravity when the chain revolves, thus insuring a continuous supply of oil to all bearings 7 so long as there is any oil in the space.

In the modified form shown in Fig. 3 the tubes 9 are not flexible in themselves, but the connections 10 are free to turn in the hollow pins 11 which renders the mechanism flexible as a whole. The oil space 3 is formed by the tubes 9, the connections 10, and the hollow bearing pins 11, and the oil is led to the inside of the bearings 7 by the short passages 12. The space may be filled with oil by removing the plug 13.

The connections 10 are held in position in the hollow pins 11 by the pressure on the tubes 9 of the springs 14 which are attached to the links of the chain 4.

Obviously, changes in the details of construction may be made without departing from the spirit of the invention and we do not care to limit ourselves to any form or arrangement of parts.

What we claim as our invention is:—

1. The combination with a chain having bearings, of a continuous flexible duct communicating with the bearings.

2. The combination with a chain having links and bearings, of a flexible container attached to the links and having passages communicating with the bearings.

3. The combination with a tractor tread having links and bearings, of a flexible duct for lubricant attached to the links and communicating by passages with the bearings, substantially as set forth.

4. The combination in an oiler for a tractor tread or crawler, of a flexible duct for lubricant leading to each link of the tread, substantially as set forth.

5. In a lubricating device for a tractor tread or crawler, having links, an oil space made up of flexible tubes connected with each link.

6. In an oiler for a tractor tread having bearings, a continuous flexible duct connected with the bearings.

Signed at Pomona, California, this 17th day of September, 1917.

PAUL F. NAFTEL.
HERMAN H. GARNER.

Witnesses:
 LYNN S. BIRDSALL,
 WILBUR ADAMS.